Figure 1:
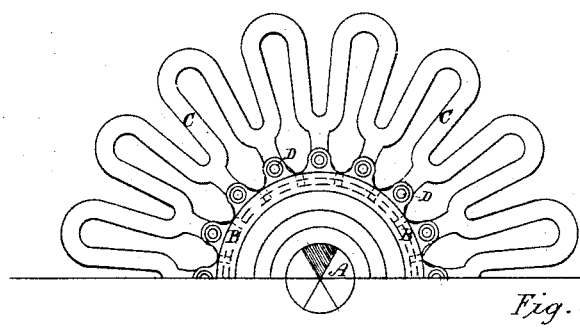

(No Model.) 7 Sheets—Sheet 1.
S. Z. DE FERRANTI & A. THOMPSON.
DYNAMO ELECTRIC MACHINE.
No. 288,316. Patented Nov. 13, 1883.

Witnesses:
L. B. Wright
E. V. Brown

Inventors:
S. Z. de Ferranti
Alfred Thompson
by their Attorneys
Baldwin, Hopkins & Payton (No Model.) 7 Sheets—Sheet 2.
S. Z. DE FERRANTI & A. THOMPSON.
DYNAMO ELECTRIC MACHINE.
No. 288,316. Patented Nov. 13, 1883.
Fig. 3.
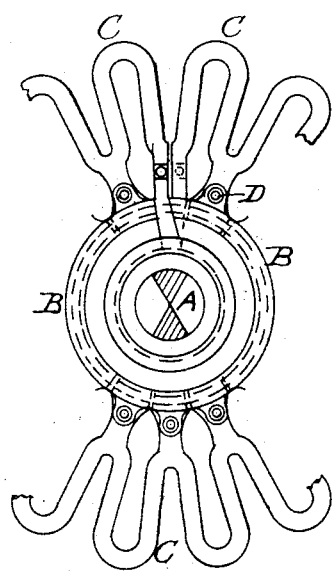
Fig. 4.
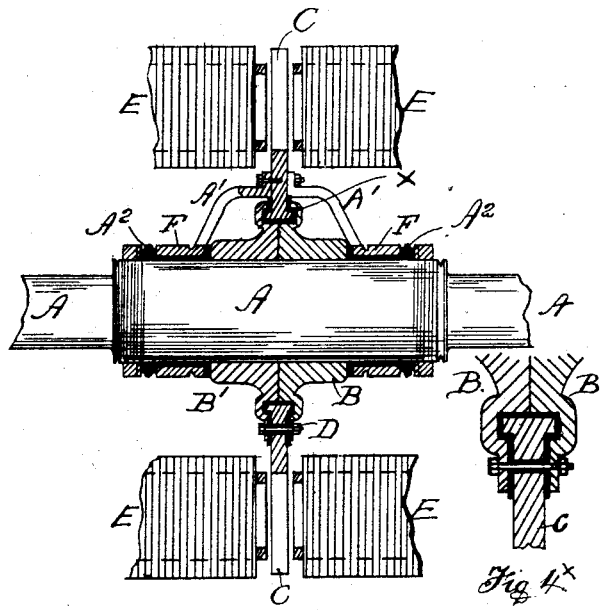
Fig. 10.
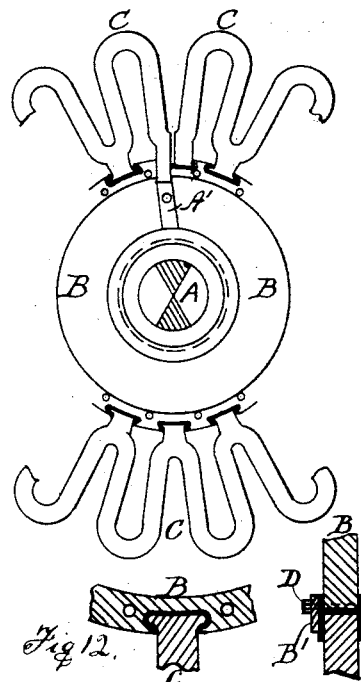
Fig. 11.
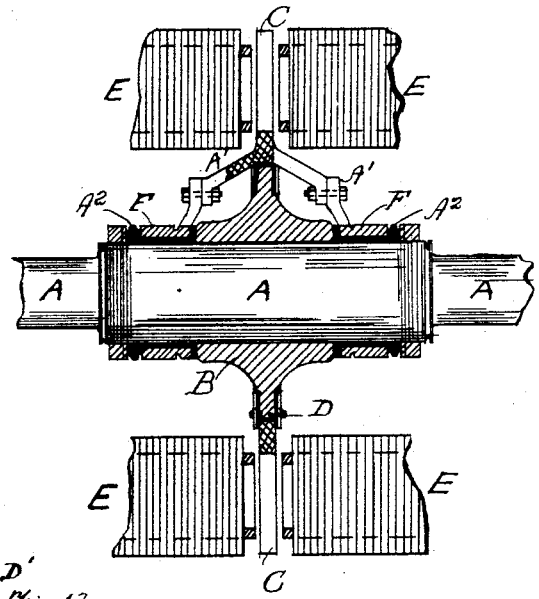
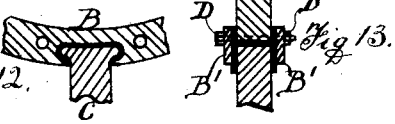
Witnesses:
Nellie Holmes.
E. V. Brown
Inventors:
S. Z. de Ferranti
and Alfred Thompson,
by their attorneys
Baldwin Hopkins & Peyton
N. PETERS. Photo-Lithographer. Washington. D. C.

(No Model.) 7 Sheets—Sheet 3.
S. Z. DE FERRANTI & A. THOMPSON.
DYNAMO ELECTRIC MACHINE.
No. 288,316. Patented Nov. 13, 1883.
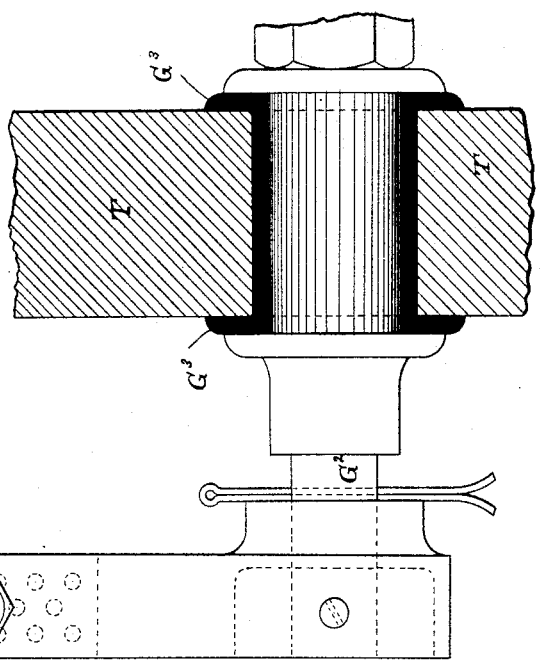
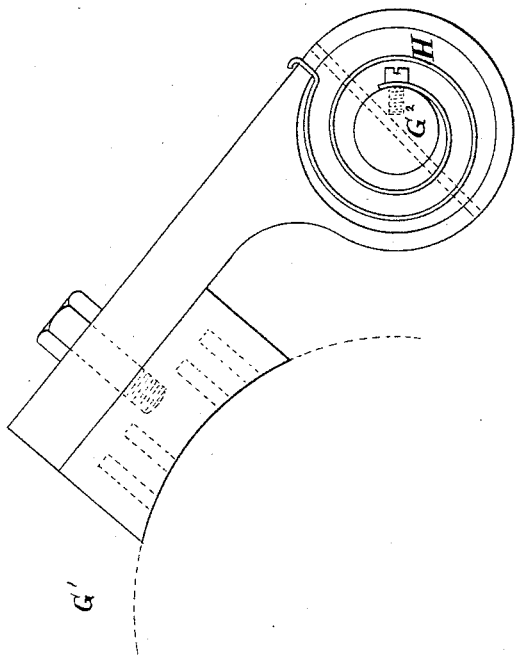
WITNESSES
Wm A. Skinkle.
Francis D. Shoemaker.
INVENTOR
S. Z. de Ferranti
Alfred Thompson
By their Attorneys
Baldwin, Hopkins & Peyton.

(No Model.) 7 Sheets—Sheet 4.
S. Z. DE FERRANTI & A. THOMPSON.
DYNAMO ELECTRIC MACHINE.
No. 288,316. Patented Nov. 13, 1883.
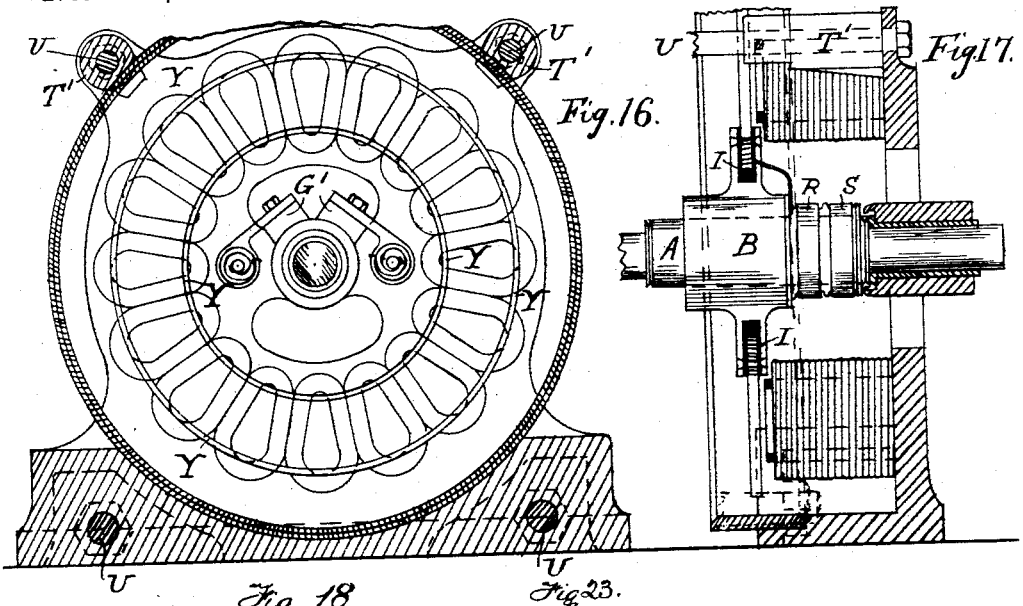
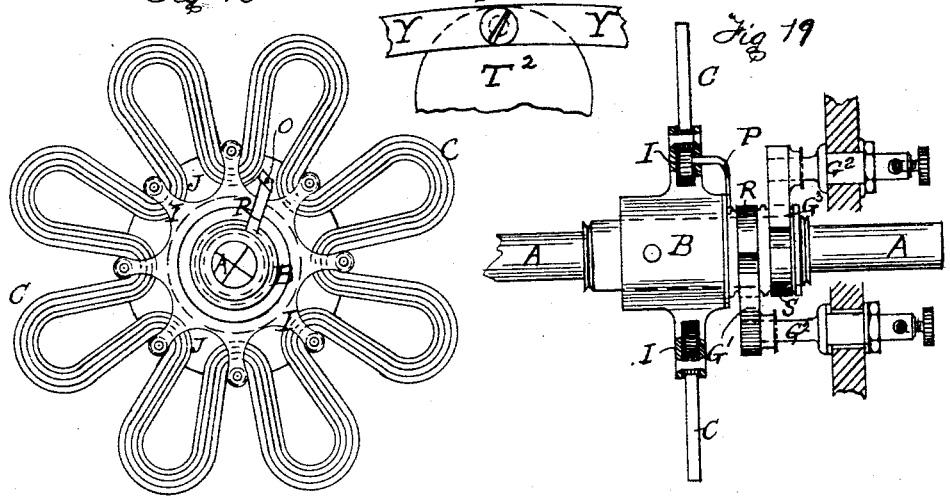
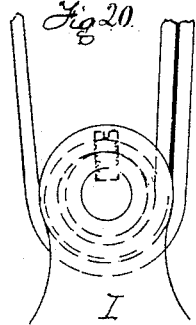
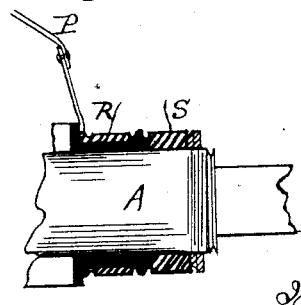
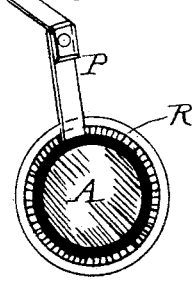
Witnesses:
Nellie Holmes.
E. V. Brown.
Inventors:
S. Z. de Ferranti
Alfred Thompson
by their Attorneys
Baldwin, Hopkins & Peyton

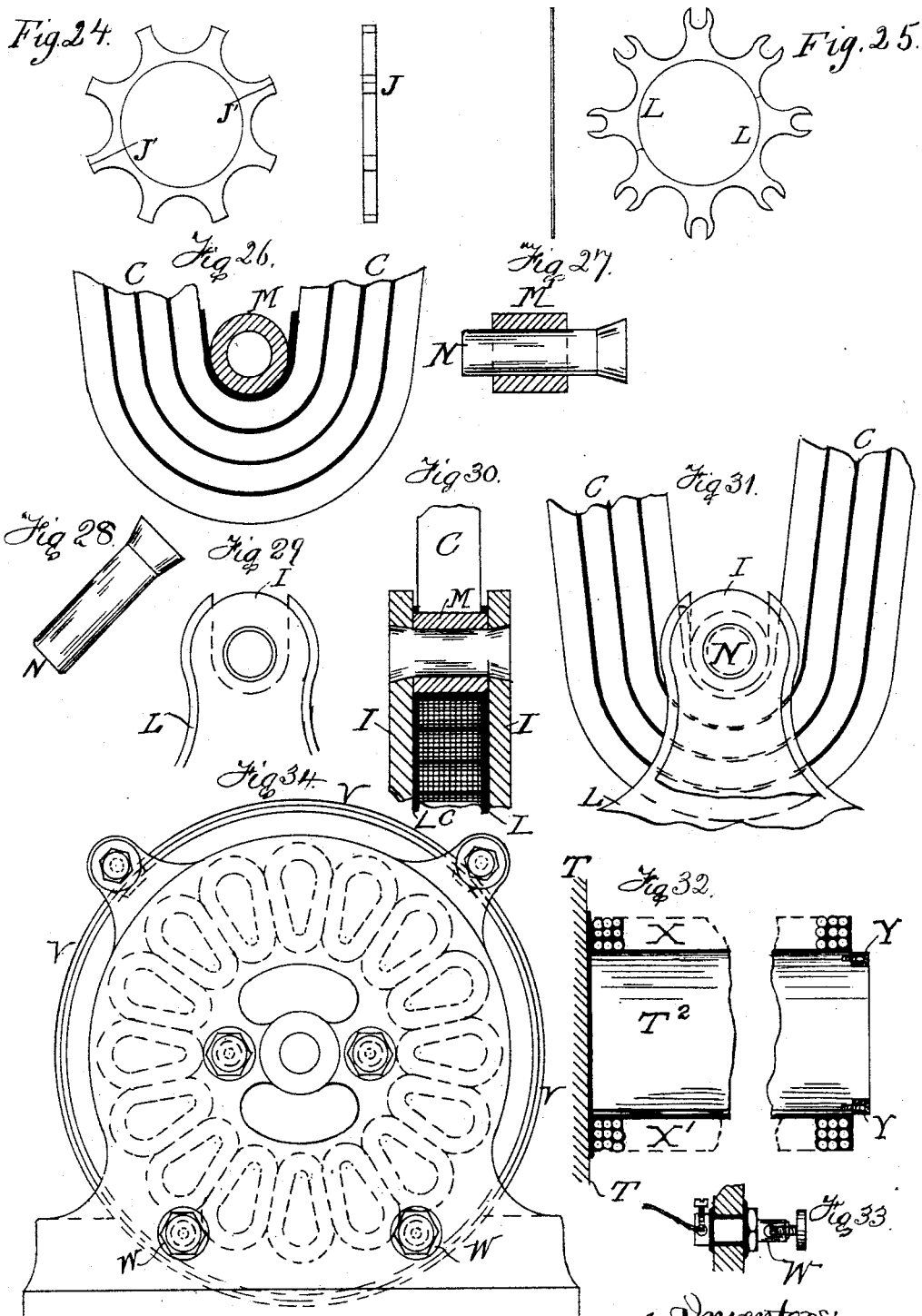

(No Model.) 7 Sheets—Sheet 6.

S. Z. DE FERRANTI & A. THOMPSON.
DYNAMO ELECTRIC MACHINE.

No. 288,316. Patented Nov. 13, 1883.

WITNESSES
Wm A. Skinkle
Francis D. Shoemaker

INVENTOR
S. Z. de Ferranti
Alfred Thompson
By their Attorneys
Baldwin, Hopkins & Payton (No Model.) 7 Sheets—Sheet 7.

S. Z. DE FERRANTI & A. THOMPSON.
DYNAMO ELECTRIC MACHINE.

No. 288,316. Patented Nov. 13, 1883.

Witnesses:
L. B. Wight
E. V. Brown

Inventors:
S. Z. de Ferranti
Alfred Thompson
by their Attorneys
Baldwin, Hopkins & Payton N. PETERS. Photo-Lithographer, Washington, D. C.

UNITED STATES PATENT OFFICE.

SEBASTIAN ZIANI DE FERRANTI, OF RICHMOND GARDENS, SHEPHERDS BUSH, AND ALFRED THOMPSON, OF GUILDFORD PLACE, RUSSELL SQUARE, COUNTY OF MIDDLESEX, ENGLAND.

DYNAMO-ELECTRIC MACHINE.

SPECIFICATION forming part of Letters Patent No. 288,316, dated November 13, 1883.

Application filed November 22, 1882. (No model.) Patented in England July 18, 1882, No. 3,419; in France October 31, 1882, No. 151,836; in Germany November 7, 1882; in Belgium December 7, 1882, No. 59,767; in Italy December 29, 1882, No. 429; in Spain January 8, 1883, No. 4,145, and in the East Indies July 24, 1883, No. 121.

*To all whom it may concern:*

Be it known that we, SEBASTIAN ZIANI DE FERRANTI, a subject of the Queen of Great Britain, residing at Richmond Gardens, Shepherds Bush, electrician, and ALFRED THOMPSON, a subject of the Queen of Great Britain, residing at Guildford Place, Russell Square, electrician, both in the county of Middlesex, England, have invented certain new and useful Improvements in Dynamo-Electric Machines or Electric Generators, (for which we have received Letters Patent in Great Britain, dated July 18, 1882, No. 3,419,) of which the following is a specification.

A well-known method for the production of alternating currents is by means of bobbins of insulated wire set around the periphery of a wheel, which is caused rapidly to rotate and to carry the bobbins between the poles, alternately north and south, of electro-magnets ranged around the wheel and on either side of it, with the poles alternately north and south. Then as each bobbin approaches the pole of any magnet a current is set up in the coils of the bobbin, and as the bobbin leaves the pole a current is set up in the opposite direction. By suitable means these currents are led into a main or outside circuit.

Now, in place of using bobbins it has lately been proposed by Sir William Thomson to substitute one single conductor, of copper or such like metal, passing, with very numerous corrugations, in an undulating form around the wheel, and bound down to it by a binding passing round the wheel and outside a series of pins which lie in the hollows or undulations of the zigzag conductor. It has also been proposed by Dr. John Hopkinson to use single conductors wound in a zigzag manner between iron studs or pole-pieces projecting out from the side of the revolving disk or wheel. We use no iron pole-pieces; but we employ one single conductor passing in an undulating form around the wheel, and, according to our invention, we so form it that there shall be as many radial portions of the zigzag conductor as there are magnets on either side of the revolving wheel, so that if the wheel were at rest this conductor might be traced in a zigzag direction, first outward from the center of the wheel between the adjacent poles of the fixed or field magnets on one side of the wheel, then returning inward toward the center, between one of these poles and the pole of a succeeding magnet, and so on until the circuit is completed. The field-magnets are so arranged that the poles of the several field-magnets on one side of the wheel are alternately north and south, and so that a north pole of a magnet on one side of the wheel faces a south pole of a magnet on the opposite side of the wheel. On revolving the wheel each radial portion of the zigzag copper conductor will, as it is carried from the pairs of opposite magnets north south to south north, have electricity generated therein centrifugally and centripetally from the pairs of magnets south north to north south, and so produce a continuous alternating current, all the radial arms of the conductor being at all times uniformly acted upon, and the maximum effect so obtained; also, according to our invention, we firmly bolt or fix the zigzag conductor to the wheel in such manner that the centrifugal strain which is set up when the machine is driven, and which tends to separate the conductor from the wheel, is not supported by a circumferential binding, but is directly transmitted to and is sustained by the body of the wheel; or in place of this single zigzag conductor we may employ a coil of insulated wire or other conductor, such wire or conductor taking a like zigzag course, but passing many times around the wheel before the end is brought out to be connected with the outside circuit. The insulated conductor may be first wound in the form of a hoop and then bent by suitable tools into the zigzag form. In the winding of the field-magnets, also, we cause the conductor to take a zigzag course among the cores arranged in a circle and to pass alternately on the inner and outer side of each core. The conductor thus forms a double zigzag or wickerwork in which the cores are inclosed. This method of winding, while completely enveloping the cores, leaves interstices, which facilitate the dissipation of heat.

Figure 2:
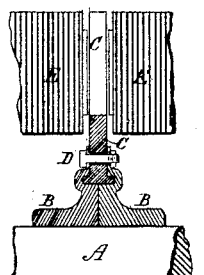
Figure 5:
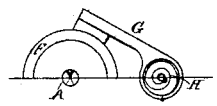
Figure 14:
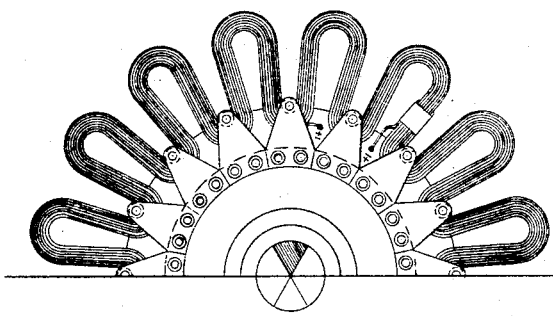
Figure 15:
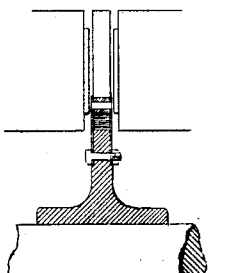
Figure 36:
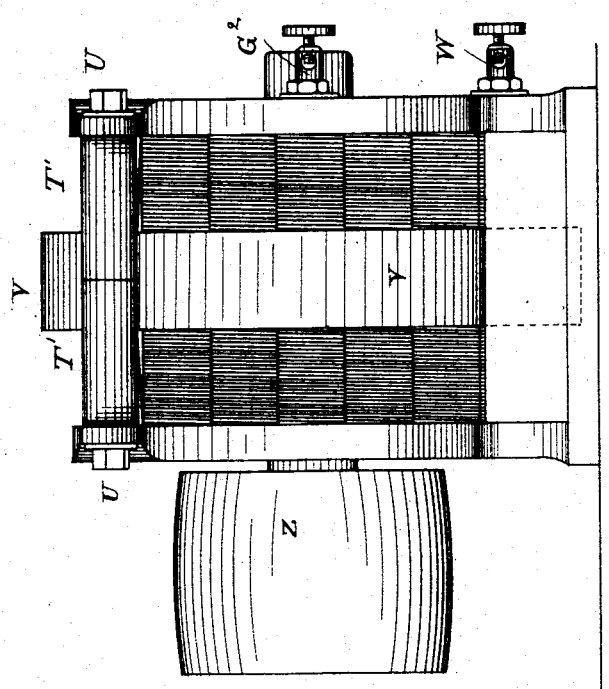
Figure 35:
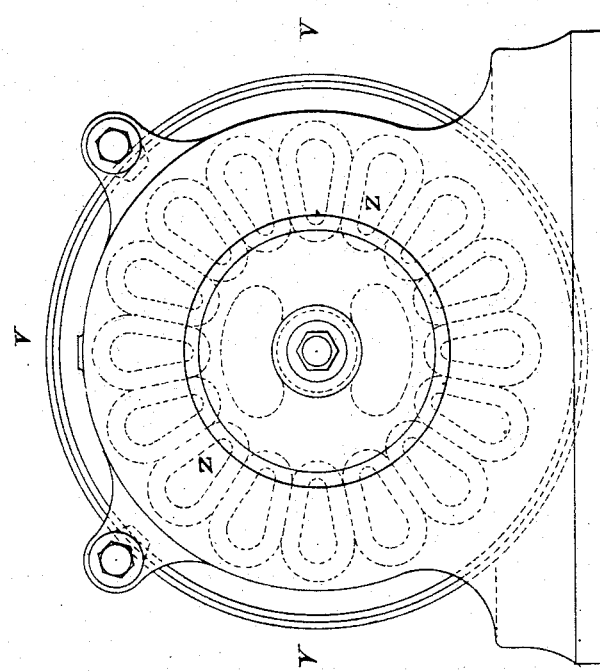
Figure 37:
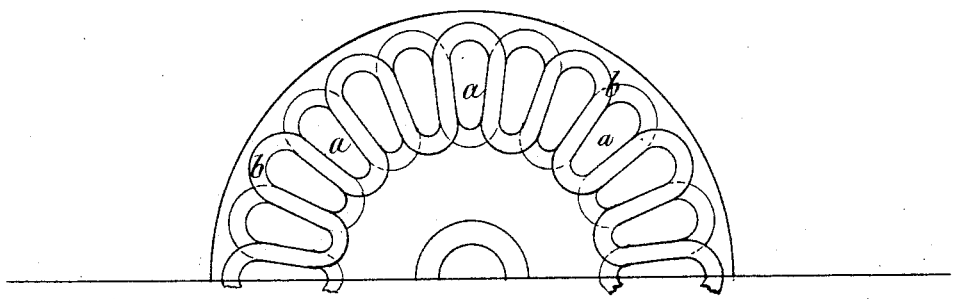
Figure 38:
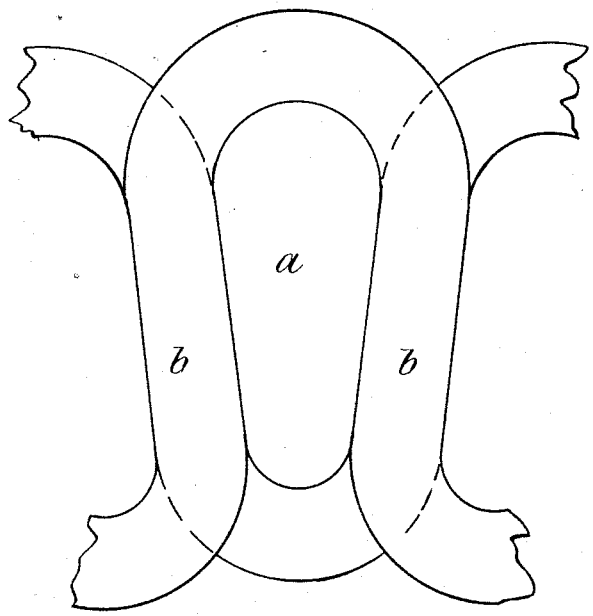
Figure 39:
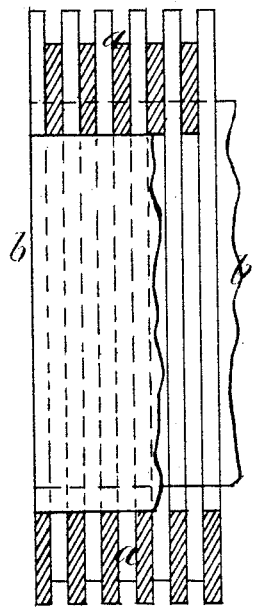

Figure 1 of the drawings hereunto annexed is a side elevation of a portion of the wheel and zigzag conductor of our dynamo-electric machine. Fig. 2 is a transverse section of the same, and also indicates the position of the stationary field-magnets. Figs. 3 and 4 are similar views, showing how the current is conveyed away from the ends of the bar-conductor. Fig. 4× is a detail view, showing the insulation of the zigzag armature. Figs. 5, 6, and 7 show the way in which we form metallic blocks for conveying away currents from metallic rings surrounding the revolving axis of the machine. Figs. 8, 9, 10, and 11 show a modified way of forming the zigzag bar-conductor. Figs. 12 and 13 show on a somewhat larger scale the way in which the feet of this conductor are secured to the periphery of the wheel. Figs. 14 and 15 show another form of the zigzag conductor. Figs. 16 to 22 show the way in which the current is conveyed away from the two ends of the strip forming this zigzag conductor. Fig. 16 is a transverse section of the machine with the zigzag conductor removed. Fig. 17 is a longitudinal section of one-half of the machine. Fig. 18 shows the wheel and a conductor formed with sixteen radial parts, instead of thirty-two, as in Fig. 14. Fig. 19 shows an edge view, partly in section, of the wheel and zigzag conductor, and also shows the contact-rings surrounding the axle, and the contact-blocks bearing against these rings. Fig. 20 shows how one end of the conductor is put into metallic connection with the body of the wheel. Figs. 21 and 22 show how the other end of the conductor is put into metallic connection with an insulated ring surrounding the axle. Fig. 23 shows how guard-rings of non-magnetic material are secured to the faces of the magnet-poles. Figs. 24 to 31 show the way in which the zigzag conductor is secured to the periphery of the wheel. The parts shown at Figs. 26 to 31 are on a larger scale than those shown at Figs. 24 and 25. Fig. 32 shows one of the fixed magnets. Fig. 33 shows one of the terminals by which a continuous current is conveyed to the insulated-wire coils of the permanent magnets. Fig. 34 is an end view, Fig. 35 is an opposite end view, and Fig. 36 is a front view, of the complete machine when a zigzag conductor formed with sixteen radial portions is used. Fig. 37 is a side elevation of one-half of a circle of magnet-cores with an insulated conductor wound upon them in a double-zigzag or wicker-work fashion. Fig. 38 is a side elevation, on a larger scale, of one of the magnets; and Fig. 39 is an end view of the same.

In Figs. 1, 2, 3, and 4, A is the axis of the machine. B is the wheel, consisting of two rings of bronze, firmly keyed or fixed upon it. The zigzag conductor C is of copper. It is cast or formed in one piece, together with feet projecting from the inner turns of the several zigzag bends. The feet are formed with enlarged ends, as shown at Figs. 2 and 4. The two rings forming the wheel B are, as is also shown in these two figures, formed to embrace and hold between them the enlarged ends of the feet. The two rings are drawn together by means of bolts D, and so caused to grip and hold between them the enlarged ends of the feet. To prevent metallic contact between the feet and the rings B, the feet are enveloped in wrappers of vulcanized fiber or other insulating material, as shown by the black lines in Figs. 2 and 4 and on a somewhat larger scale at Fig. 4×.

Figures 8, 9:
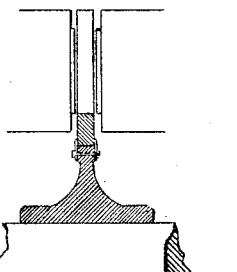

The position of the field-magnets is indicated in Fig. 4. When there are thirty-two radial portions of the zigzag conductor, as shown at Figs. 1 and 8, there are sixty-four magnet-poles, thirty-two on either side. They may be wound in the ordinary way, or they may be wound according to our improved method, hereinafter more fully described. These field-magnets may be excited by a continuous-current machine of any known type.

The two ends of the zigzag bar-conductor are in Fig. 4 shown to be connected by metallic bars A' to rings F of phosphor-bronze, surrounding the axle A, and insulated therefrom by an interposed layer of non-conducting material, as indicated by the black lines $A^2$. Against each ring a metallic block, G', preferably of copper, is caused to bear. It is carried by a lever-arm, G, and this arm is by a coiled spring, H, turned toward the ring, as shown at Figs. 5, 6, and 7. The lever-arm can turn around a pin, $G^2$, clamped to the end frame, T, of the machine, as shown at Fig. 7, and insulated from the frame by insulating material $G^3$, as shown in that figure. The outer end of the metallic pin $G^2$ forms an ordinary terminal clamp, as shown at Fig. 36, to which a main-line wire can be coupled in the ordinary way. As will be seen at Figs. 6 and 7, numerous holes are bored into the face of the block G', and these are filled with plumbago compressed into them with heavy pressure. This way of taking off an electric current from the revolving part of a dynamo-electric machine is applicable not only to the machine shown in the drawings, but also to other dynamo-electric machines.

Instead of the two ends of the zigzag bar-conductor being connected to two insulated rings on the axle, as shown at Fig. 4, one end of the bar only may be connected to an insulated ring on the axle and the other to the metallic wheel itself and be conveyed away through the axle, as hereinafter described with reference to Fig. 19.

In the modified form of the conductor shown at Figs. 8, 9, 10, and 11 the feet of the conductor are made dovetailed, and adapted to slide sidewise into corresponding grooves in the face of the wheel. The same letters indicate like parts to those shown in Figs. 1, 2, 3, and 4. The insulation of the feet is secured, as in the previously-described construction, by enveloping them with insulating material, as shown by the black lines in Figs. 10 and 11, and in Figs. 12 and 13. Rings B', attached on either side of the wheel by bolts D, prevent the feet escaping from the grooves in the wheel. Rings of insulating material are interposed between the rings and the wheel, as shown by the black lines in Fig. 13.

The zigzag conductor shown at Figs. 14 and 18 is formed of a flat band of copper passing several times around the wheel. To form the zigzag conductor the band is first wound round and round to form a circular hoop, one convolution being separated from another by ribbons of silk. The conducting-ring is then bent to the zigzag form and secured to the wheel. The wheel is of brass or other suitable metal, and is cast with lugs I, radiating out from its periphery on either side, as shown at Figs. 17, 18, and 19; or these lugs may be bolted to the body of the wheel by means of bolts D, as shown at Figs. 14 and 15. Between the lugs I is placed a ring of wood, J, (shown at Fig. 24,) divided into two halves, as shown by the lines J', to allow of its being placed between the lugs. The circumference of the ring of wood J has recesses formed in it for the inner ends of the zigzag bends of the conductor C to lie in. When the ring of wood J has been placed between the lugs I of the wheel, the conductor is placed around it, with the inner ends of its bends entering the recesses in the periphery of the wooden ring. The conductor C and the wooden ring J are shifted around the body of the wheel until the conductor is brought into such a position that pins K, passed through the ends of the lugs, come on the outer side of the inner bends of the zigzag, as shown at Figs. 14 and 18. A ring of insulating material, L, of the form shown at Fig. 25, and divided into two halves, is placed on either side of the conductor, between it and the lugs I. Against the outer side of each of the inner bends of the zigzag is placed a stout tube, M, of insulating material. (See Figs. 26 and 27.) The tubes are put into place in succession, one after the other, and while each one is held in place a rivet-pin, N, (see Figs. 27, 28, 29, 30, and 31,) is passed through it and through holes in the outer extremities of the two lugs I, which are on either side of it. The end of the rivet-pin is then riveted over at the end to hold it fast. One end of the copper strip which forms the zigzag conductor is then put into metallic connection with one of the rivet-pins, as shown at Fig. 20. The tube M, surrounding this pin, need not be of insulating material. The other end of the copper strip is made fast to one side of the wooden ring J, as shown at O, Fig. 18, and is by a strip of copper, P, (see Figs. 21 and 22,) put into metallic connection with an insulated metallic ring, R, by which the axle A is surrounded, as shown at Figs. 17, 18, 19, 21, and 22. Surrounding the axle, and in direct contact therewith, is also another metallic ring, S. This ring is consequently in metallic communication with the end of the copper strip forming the conductor, which is secured to one of the rivet-pins, as above mentioned; or both of the metallic rings R S might be insulated, and one connected to one end of the copper strip and the other to the other end of the copper strip, as described with reference to Figs. 4 and 11.

Against each ring is held a metallic conducting-block, G', as shown at Fig. 19. One of these blocks is shown on a larger scale at Figs. 6 and 7, previously described. The pin G$^2$, which forms the pivot for the lever-arm which carries each block, is, as shown in Figs. 19 and 7, and also in Figs. 16 and 34, clamped to the end frame, T, of the machine, and the one which forms the conductor from the block that bears against the insulated ring R is also insulated from the frame, as shown in those figures. The other need not be so insulated. The outer ends of the pins G$^2$ form the two terminals for the ends of the line-wires to be coupled to, as shown at Fig. 19.

The two end frames T of the machine are shaped in the manner shown at Figs. 16, 17, and 36, so that the lower parts of the two frames abut one against the other, and they are held together by bolts U. Other bolts U draw together the upper parts of the frames. These upper bolts pass through distance-pieces T', which also abut against one another. V is a guard-ring, held in place by its ends lying in grooves in the lower part of the two end frames and in the distance-pieces T'.

W W in Figs. 34 and 36 are insulated terminals carried by one of the end frames T. A section through one of these terminals is also shown at Fig. 33. Through them a current is conveyed to the insulated-wire coils of the several fixed magnets.

The cores of the fixed magnets are cast together with the end frames, T. Onto each of them is slipped a bobbin, X, of insulating material, carrying coils of insulated wire, as shown at Fig. 32, which represents one of the cores marked T$^2$ standing out from the inner face of one of the end frames, T. The bobbin is shown partly in section by dark lines. Some of the insulated wires carried by the bobbin are also shown in section. The bobbins are held onto the cores by means of rings Y, fixed to the ends of the cores, as shown at Fig. 32, and also at Figs. 16 and 17, and on a larger scale at Fig. 23.

The axle of the machine may be driven by a driving-belt passing over a belt-pulley, Z, fixed on the axle, as seen in Figs. 35 and 36, or the axle may be revolved in other suitable ways.

Fig. 37 shows a side elevation of one-half of a circle of field-magnets, having the insulated wire or conductor wound upon them, according to our invention, in a double-zigzag or wicker fashion.

Fig. 38 is a side elevation of the magnet-poles on a larger scale. Fig. 39 is an end view of the same. In these figures $a$ are the magnet-poles, and $b$ the insulated conductor, wound in a double zigzag, after the manner of wicker-work. An advantage of this method of winding is that while each magnet is completely enveloped in the winding, interstices are nevertheless left, which are favorable to the dissipation of heat generated in the coils.

We claim as our invention—

1. The combination, substantially as set forth, of a wheel, disk, or support, and an armature-coil or conducting-bar of zigzag shape, secured to the periphery of said support by its inner bends only.

2. The combination, substantially as set forth, of a wheel, disk, or support, and a conductor or armature bar formed in zigzag shape, with feet or projections on the inner bends of the bar, by which they are secured to the periphery of the support.

3. The combination, substantially as set forth, of a wheel, disk, or support, and an armature consisting of a strip of copper or other like conducting metal wound into a circular zigzag ring in convolutions, one over the other, and secured by its inner bends only to the periphery of said support.

4. The combination, substantially as set forth, of, first, a wheel, disk, or support; second, an armature composed of a single circular zigzag conductor secured by the inner bends only to said wheel or support; third, two circular rings of magnets, one on either side of the armature, each ring having as many magnet-poles as there are radial portions in the zigzag conductor; fourth, two metallic rings surrounding the axis of the armature-coil, one connected to one end of the conducting bar or strip facing the coil and the other to the other end of the bar or strip; and, fifth, contact brushes or strips bearing against these two rings to convey the current from them.

5. The herein-described perforated copper block, the perforations of which are filled with plumbago for taking the current from the dynamo-electric machine.

6. The combination, substantially as set forth, of a dynamo-electric machine, of a revolving-axle, a ring of phosphor-bronze on the axle, and a perforated copper contact-block, the perforations in which are filled with compressed plumbago.

7. The combination of the field-magnets with the magnet-coils wound thereon in zigzags, reversed relatively to each other, substantially as illustrated in Fig. 38.

SEBASTIAN ZIANI DE FERRANTI.
ALFRED THOMPSON.

Witnesses:
JNO. DEAN,
GEO. J. B. FRANKLIN,
*Both of* 17 *Gracechurch Street, London.*